(12) United States Patent
Ma

(10) Patent No.: US 10,959,403 B2
(45) Date of Patent: Mar. 30, 2021

(54) ENTERTAINING FEEDER

(71) Applicant: TONGFU MANUFACTURING CO., LTD., Nanjing (CN)

(72) Inventor: Yaomin Ma, Nanjing (CN)

(73) Assignee: TONGFU MANUFACTURING CO., LTD., Nanjing (CN)

( * ) Notice: Subject to any disclaimer, the term of this patent is extended or adjusted under 35 U.S.C. 154(b) by 522 days.

(21) Appl. No.: 14/625,228

(22) Filed: Feb. 18, 2015

(65) Prior Publication Data
US 2016/0235035 A1    Aug. 18, 2016

(51) Int. Cl.
*A01K 5/02* (2006.01)
*A01K 5/01* (2006.01)

(52) U.S. Cl.
CPC .......... *A01K 5/0225* (2013.01); *A01K 5/0114* (2013.01); *A01K 5/0275* (2013.01)

(58) Field of Classification Search
CPC ...... A01K 5/0241; A01K 5/0114; A01K 5/02; A01K 5/0233; A01K 5/025; A01K 5/0225; A01K 5/0291
See application file for complete search history.

(56) References Cited

U.S. PATENT DOCUMENTS

| 2,168,639 A * | 8/1939 | Yeaman | A01K 5/0233 119/56.1 |
| 5,908,007 A * | 6/1999 | Duin | A01K 5/0291 119/51.11 |
| 6,487,987 B1 * | 12/2002 | Choi | A01K 5/0291 119/51.11 |
| 6,904,868 B2 * | 6/2005 | Block | A01K 5/0114 119/51.12 |
| 7,263,953 B2 * | 9/2007 | Sundararajan | A01K 5/0275 119/496 |
| 7,650,855 B2 * | 1/2010 | Krishnamurthy | A01K 5/0291 119/51.11 |
| 7,913,647 B1 * | 3/2011 | Martin | A01K 5/0114 119/52.1 |
| 8,347,817 B1 * | 1/2013 | Miller | A01K 5/0233 119/54 |

(Continued)

FOREIGN PATENT DOCUMENTS

CN                104054591 A        9/2014

*Primary Examiner* — Michael H Wang
(74) *Attorney, Agent, or Firm* — Oliff PLC

(57) ABSTRACT

The invention relates to a pet feeder, in particular, to a feeder having a remote control function, and more specifically to an entertaining feeder. In view of problems such as currently, pet hardly participates in an entire feeding process, so that the need of pet hardly matches manual feeding, and pet cannot obtain a sense of delight and a sense of achievement in the feeding process, an entertaining feeder is provided. Feeder is mainly formed by a feeding body and a controller, where feeding body mainly includes a food container provided with a food leaking hole, a bracket, and a food tray; and the controller mainly includes a control signal transmitter and a controller positioner. By using the controller formed by combining the controller positioner and the control signal transmitter, pet itself can be urged to operate control signal transmitter and trigger a control signal receiver.

9 Claims, 6 Drawing Sheets

(56) References Cited

U.S. PATENT DOCUMENTS

| | | | | |
|---|---|---|---|---|
| 8,588,967 B2* | 11/2013 | Carelli | | A01K 5/0114 221/268 |
| 8,701,595 B2* | 4/2014 | Jin | | A01K 5/0291 119/51.01 |
| 8,807,089 B2* | 8/2014 | Brown | | A01K 1/0107 119/712 |
| 9,049,840 B1* | 6/2015 | Parness | | A01K 5/0233 |
| 9,414,568 B2* | 8/2016 | Veness | | A01K 5/0275 |
| 2002/0096120 A1* | 7/2002 | Busha | | A01K 5/0291 119/51.5 |
| 2003/0116099 A1* | 6/2003 | Kim | | A01K 15/021 119/719 |
| 2006/0000418 A1* | 1/2006 | Kubala | | A01K 5/0233 119/53 |
| 2007/0119378 A1* | 5/2007 | Fick | | A01K 5/0114 119/52.1 |
| 2008/0282988 A1* | 11/2008 | Bloksberg | | A01K 5/02 119/51.02 |
| 2008/0302305 A1* | 12/2008 | Beaudoin | | A01K 5/0233 119/51.12 |
| 2011/0139076 A1* | 6/2011 | Pu | | A01K 5/0114 119/51.02 |
| 2012/0234248 A1* | 9/2012 | Lytle | | A01K 5/0233 119/54 |
| 2013/0319337 A1* | 12/2013 | Davis | | A01K 5/0114 119/57.1 |
| 2014/0060441 A1* | 3/2014 | Baxter | | A01K 5/0291 119/61.5 |
| 2015/0143750 A1* | 5/2015 | Jalbert | | E06B 7/32 49/25 |
| 2016/0007565 A1* | 1/2016 | Trottier | | A01K 5/02 119/51.02 |
| 2016/0120146 A1* | 5/2016 | Parness | | A01K 5/0114 119/61.4 |

* cited by examiner

ENTERTAINING FEEDER

BACKGROUND

Technical Field

The present invention relates to a pet feeder, in particular, to a feeder having a remote control function, and more specifically to an entertaining feeder.

Related Art

To meet the demand of pet feeding, currently, various forms of pet feeders have been developed on the market. However, these feeders only have an ultimate goal of pet feeding; therefore, both start manner setting and control manner setting require manual involvement.

For example, for a mechanical feeder, a food leaking mouth needs to be manually opened or closed; and when a person forgets feeding, the need of a pet cannot be met.

To solve the foregoing problem, a feeder having an automatic opening and closing function is developed. However, this type of feeder requires manually presetting the opening time and the closing time; therefore, the need of a pet is not catered for.

Some feeders improve, by means of remote manipulation and with the participation of a monitor, the extent to which manual feeding caters for the need of a pet.

However, none of the foregoing manners considers participation of a pet itself in a feeding process, which therefore cannot promptly and quickly meet the need of a pet to the greatest extent. In addition, in an entire feeding process, only the lowest physiological need of a pet can be met, and a higher entertainment need cannot be met.

SUMMARY

In view of problems such as currently, a pet hardly participates in an entire feeding process, so that the need of the pet hardly matches manual feeding, and the pet cannot obtain a sense of delight and a sense of achievement in the feeding process, the present invention provides an entertaining feeder. The feeder is mainly formed by a feeding body and a controller, where:

the feeding body mainly includes:

a food container provided with a food leaking hole, the food container being rotatable along a rotation shaft, and a control signal receiver being disposed at the rotation shaft;

a bracket, the rotation shaft being fastened to the bracket; and a food tray, the food tray being correspondingly disposed below the food leaking hole; and the controller mainly includes:

a control signal transmitter, the control signal transmitter corresponding to the control signal receiver; and a controller positioner, the controller positioner being disposed at the control signal transmitter.

In the present invention, by using the controller formed by combining the controller positioner and the control signal transmitter, a pet itself can be urged to operate the control signal transmitter and trigger the control signal receiver, so as to achieve the objective of feeding.

Further, preferably, the entertaining feeder disclosed in the present invention further includes a housing, where the bracket is disposed inside the housing, the food tray is a drawable food bowl, and a groove for the food bowl to be drawn to move is formed below the bracket.

In addition, based on the technical solution of the housing and the drawable food bowl, the entertaining feeder disclosed in the present invention further includes a food guiding groove, where one end of the food guiding groove is disposed below the food leaking hole, and the other end is connected to the food bowl. In this way, a major objective of guiding food during falling is achieved.

Still further, in the present invention, two manners used by the controller positioner are preferably selected. In a first manner, a bait container with an air vent is used, and in a second manner, an LED lamp is used. One of these two manners may be selected for use, these two manners may also be combined for use, and these two manners may further be combined with other manners for use.

In addition, the present invention further discloses a technical solution in which a buckle and a slot that match each other are formed correspondingly on the housing and the controller. In this way, the controller and the housing can be detachably fastened together to ensure stability of combination of the controller and the housing.

Still further, the food container is a hollow sphere provided with the food leaking hole, an opening and closing louvre blade is disposed inside the food leaking hole, and the food container further includes a food leaking hole regulating switch connected to the opening and closing louvre blade, and a food leaking hole regulating switch moving groove disposed correspondingly. By using this food container, an amount of food leaked each time from the food container can be controlled.

Based on the technical solution, the entertaining feeder disclosed in the present invention further includes a removable and insertable sucking disc, where the removable and insertable sucking disc is fastened to the bottom of the controller. In this way, the controller can be vertically disposed, so that a pet is entertained to a greater extent in a feeding process.

Preferably, the present invention further discloses that the control signal transmitter is a radio frequency signal transmitter, and the control signal receiver is a radio frequency signal receiver.

Finally, the present invention further discloses that the housing includes a cover and a housing body. A manual signal transmitter is further disposed on the cover, and the manual signal transmitter corresponds to the control signal receiver, so as to avoid failed control over the entire feeder that is caused by failure of the control signal transmitter in the controller.

By using the technical solutions disclosed in the present invention, a pet itself can participate in a feeding process. In this way, the physiological need of the pet can be met to the greatest extent, and psychological needs of the pet such as delight, curiosity, and a sense of achievement can also be met.

BRIEF DESCRIPTION OF THE DRAWINGS

The disclosure will become more fully understood from the detailed description given herein below for illustration only, and thus are not limitative of the disclosure, and wherein.

Figure 1:
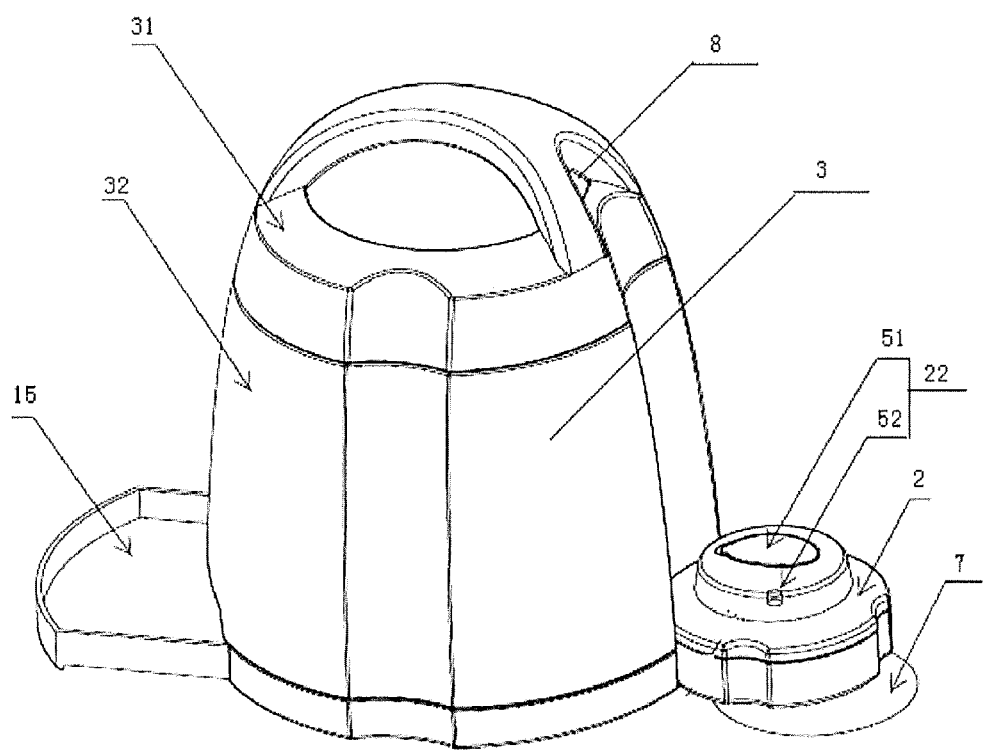
FIG. 1 is a schematic diagram of an entire entertaining feeder.

Reference numerals are as follows:

1—Feeding body, 11—Food container, 111—Food leaking hole, 12—Rotation shaft, 13—Control signal receiver, 14—Bracket, 15—Food tray, 2—Controller, 21—Control signal transmitter, 22—Controller positioner, 3—Housing, 141—Groove I, 4—Food guiding groove, 51—Bait container, 52—LED lamp, 61—Slot, 62—Buckle, 112—Opening and closing louvre blade, 113—Regulating switch, 114—Second groove, 7—Removable and insertable sucking disc, 31—Cover, 32—Housing body, and 8—Manual signal transmitter.

DETAILED DESCRIPTION

Embodiment 1

As shown in FIG. 1 to FIG. 4, an entertaining feeder is mainly formed by a feeding body 1 and a controller 2, where the feeding body 1 mainly includes:

a food container 11 provided with a food leaking hole 111, the food container being rotatable along a rotation shaft 12, and a control signal receiver 13 being disposed at the rotation shaft 12;

a bracket 14, the rotation shaft 12 being fastened to the bracket 14; and a food tray 15, the food tray 15 being correspondingly disposed below the food leaking hole 111; and the controller 2 mainly includes:

a control signal transmitter 21, the control signal transmitter 21 and the control signal receiver 13 uniquely identifying each other; and a controller positioner 22, the controller positioner 22 being disposed at the control signal transmitter 21.

Embodiment 2

Figure 3A:
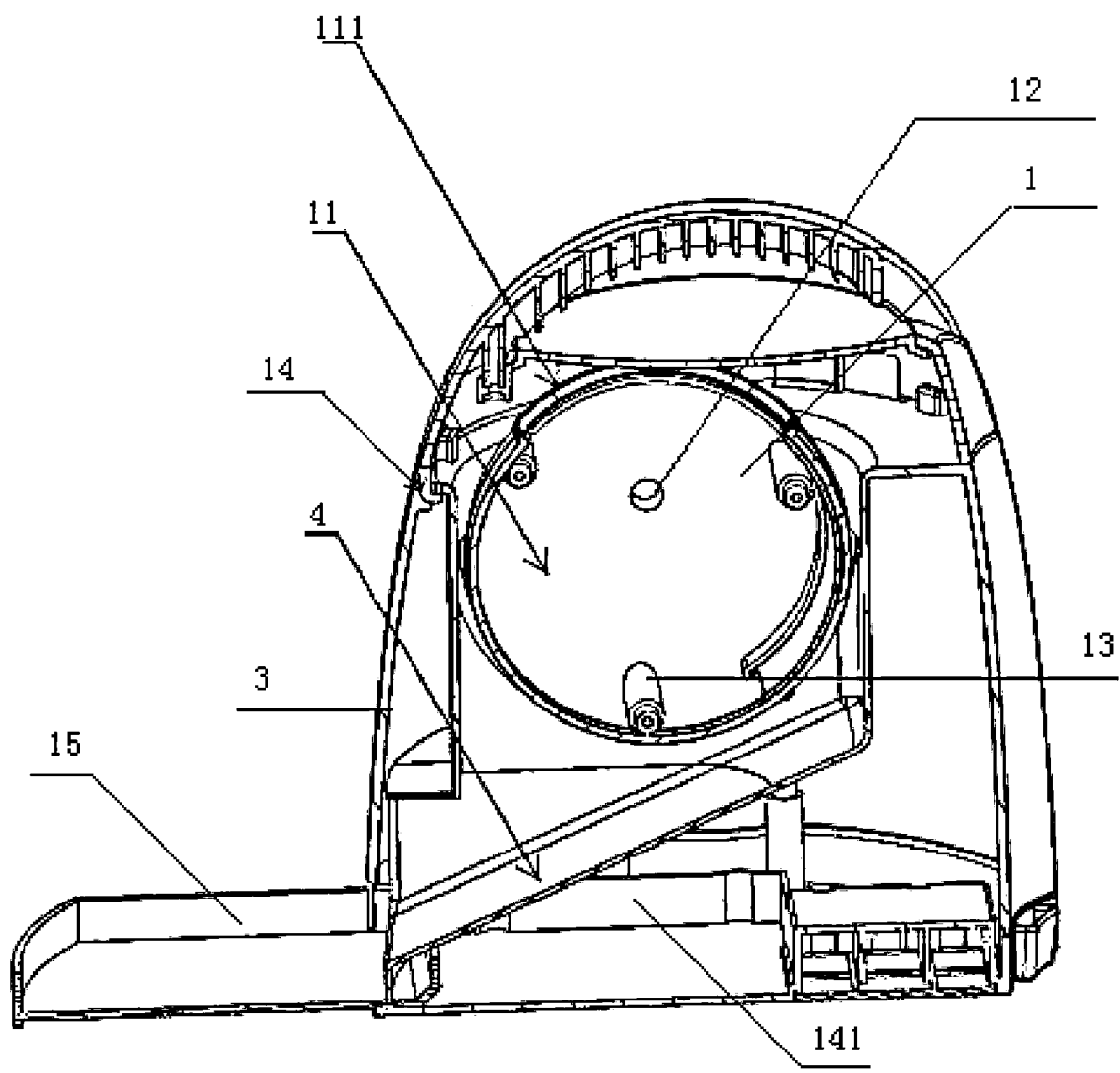
FIG. 3A and FIG. 3B are a schematic diagrams of the interior of a feeding body of an entertaining feeder.
Figure 3B:
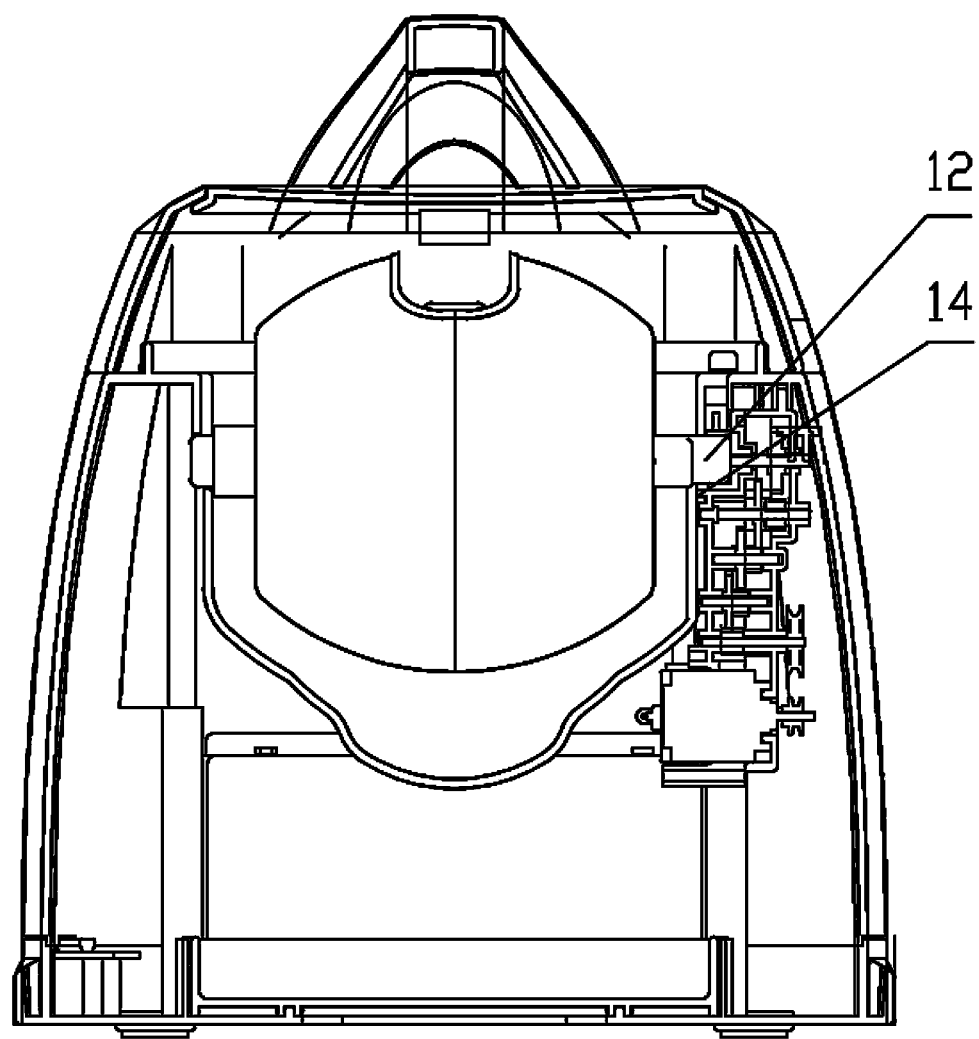

Based on the technical solution disclosed in the foregoing embodiment, specifically, referring to FIGS. 3A and 3B, the entertaining feeder further includes a housing 3, where the bracket 14 is disposed inside the housing 3, the food tray 15 is a drawable food bowl, and a groove I 141 for the food bowl to be drawn to move is formed below the bracket 14.

Embodiment 3

Based on Embodiment 2, referring to FIGS. 3A and 3B, the entertaining feeder further includes a food guiding groove 4, where one end of the food guiding groove 4 is disposed below the food leaking hole 111, and the other end is connected to the food bowl 15. In this way, a major objective of guiding food during falling is achieved.

Embodiment 4

Based on any one of Embodiment 1, Embodiment 2, and Embodiment 3, in this embodiment, two manners used by the controller positioner are particularly preferably selected. In a first manner, a bait container 51 with an air vent is used, and in a second manner, an LED lamp 52 is used. A manner that combines these two manners may also be used. For specific positions, refer to FIG. 1 or FIG. 2.

Particularly preferably, in this embodiment, the LED lamp 52 and the bait container 51 are further directly used as pressing projections, thereby making operations clearer and simpler.

Embodiment 5

Figure 2:
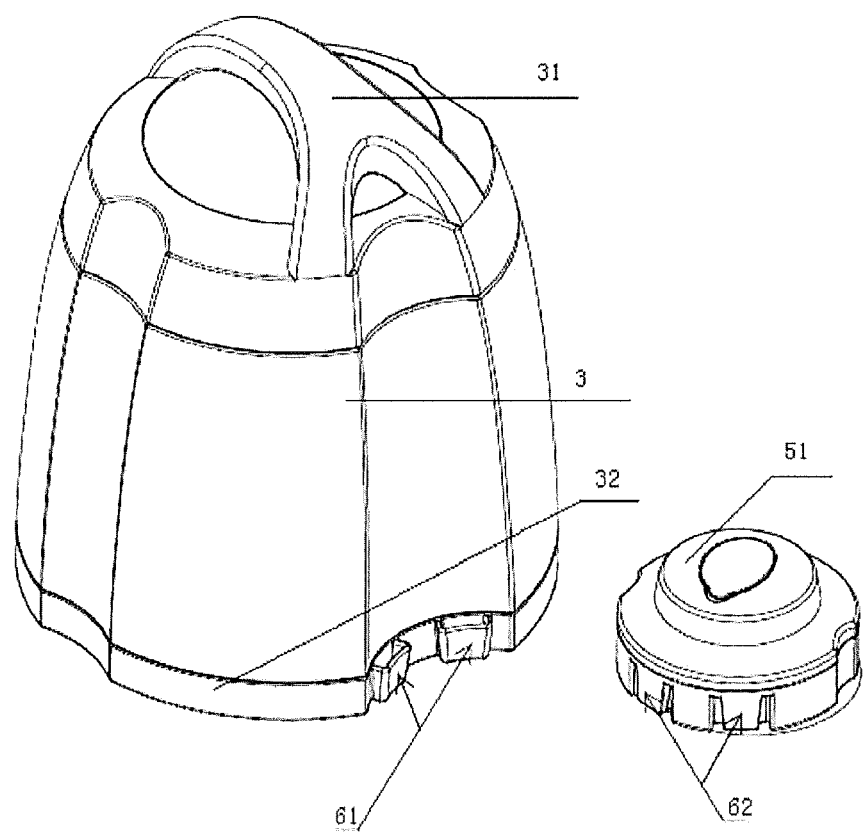
FIG. 2 is a schematic diagram of a separated entertaining feeder.

Attention is paid particularly to FIG. 2. Based on the technical solution of Embodiment 2, in this embodiment, a technical solution in which a buckle 62 and a slot 61 that match each other are formed correspondingly on the housing 3 and the controller 2 is further added. In this way, the controller 2 and the housing 3 can be detachably fastened together to ensure stability of combination of the controller 2 and the housing 3.

In this embodiment, particularly, the slot 61 is provided on the housing 3, and the buckle 62 is provided on the controller 2.

However, for the solution in this embodiment, Embodiment 2 may also be combined with the technical solution disclosed in this embodiment after Embodiment 2 is combined with a technical solution of another embodiment, which do not contradict.

Embodiment 6

Figure 4:
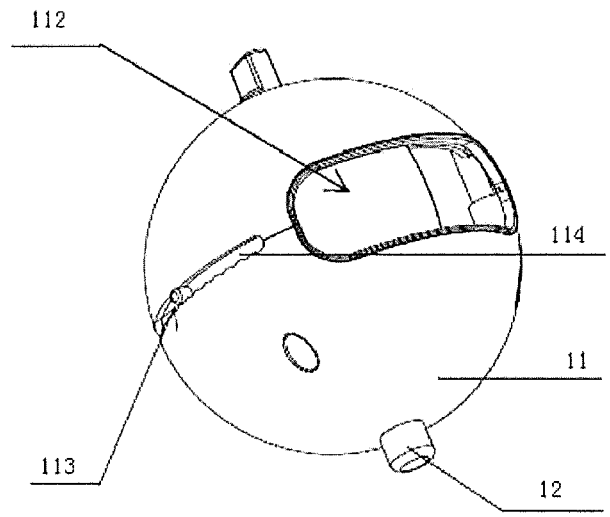
FIG. 4 is a partially enlarged diagram of a food container.

Attention is paid particularly to FIG. 4. In any one of Embodiment 1 to Embodiment 5, the form of the food container 11 disclosed in this embodiment may be preferably used.

The food container 11 is a hollow sphere provided with the food leaking hole 111, an opening and closing louvre blade 112 is disposed inside the food leaking hole, and the food container 11 further includes a food leaking hole regulating switch 113 connected to the opening and closing louvre blade 112, and a food leaking hole regulating switch moving groove disposed correspondingly, that is, a second groove 114.

Embodiment 7

Based on the technical solution disclosed in any one of Embodiment 1 to Embodiment 6, the entertaining feeder includes a removable and insertable sucking disc 7, where the removable and insertable sucking disc 7 is fastened to the bottom of the controller 2.

For a specific structure, reference may be made to FIG. 1 or FIG. 2. By using the removable and insertable sucking disc 7, the entire controller 2 can be vertically disposed.

Embodiment 8

Based on the solution of Embodiment 2, this embodiment can be combined with the solution and discloses that the housing 3 includes a cover 31 and a housing body 32. A manual signal transmitter 8 is further disposed on the cover 31, and the manual signal transmitter 8 corresponds to the control signal receiver 13, so as to avoid failed control over the entire feeder that is caused by failure of the control signal transmitter in the controller.

Embodiment 9

For ease of description, an infrared signal as a control signal of the controller is used in this embodiment.

Specific operating steps thereof are as follows:

1. Learn: Load food into the food container 11; mount the controller 2 to the feeding body 1; manually trigger the manual signal transmitter 8, so that little food falls into the food tray 15 that can be pulled out; and repeatedly demonstrate this action, so that an animal forms a conditioned reflex that "food can be obtained by pressing a button".

2. Stimulate: As stimulation, the pet obtains little food after pressing a switch of the controller 2, so as to strengthen the conditioned reflex.

3. Improve: Difficulty can be properly increased after the conditioned reflex is formed, that is, the controller 2 is separated from the feeding body 1, and difficulty is gradually increased according to the principle of changing from near to distant and from visible to invisible; and auxiliary apparatuses such as the removable and insertable sucking disc 7, the bait container 51, and the LED lamp 52 are selectively used, so that sense organs of the pet are fully mobilized to implement a process of looking for a remote control.

4. Because little food is fed each time, a circulation in which the pet walks back and forth between the controller 2 and the feeding body 1 to obtain more food is formed finally.

In this way, the need of feeding is met, and objectives of playing, satisfying curiosity, stimulating, achieving a sense of achievement, and exercising are also achieved.

Embodiment 10

Figure 5:
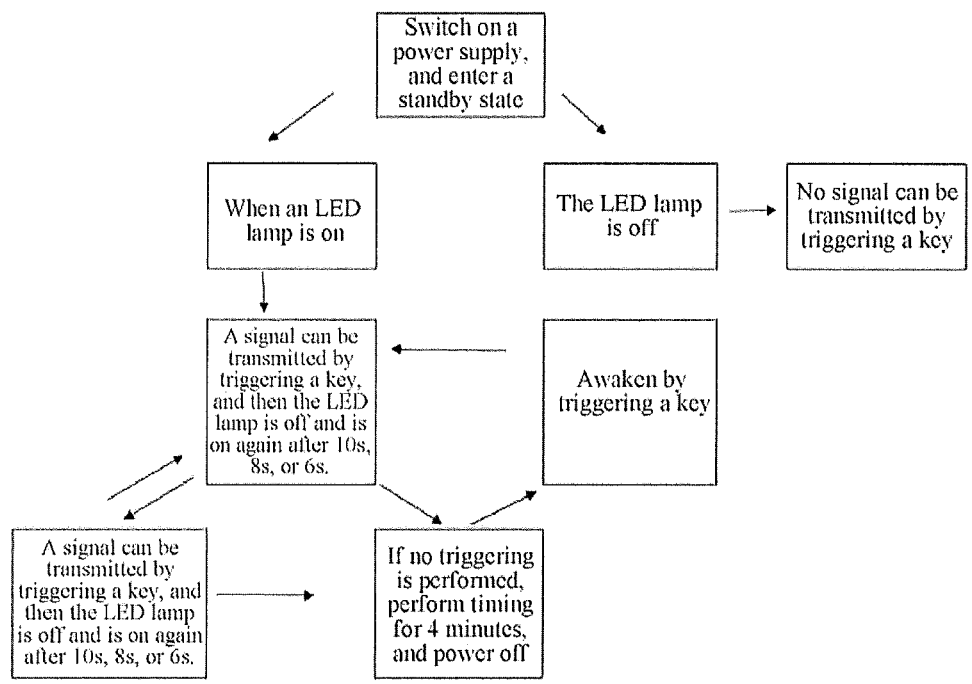
FIG. 5 shows a partial signal transmitting procedure of a control signal transmitter.
Figure 6:
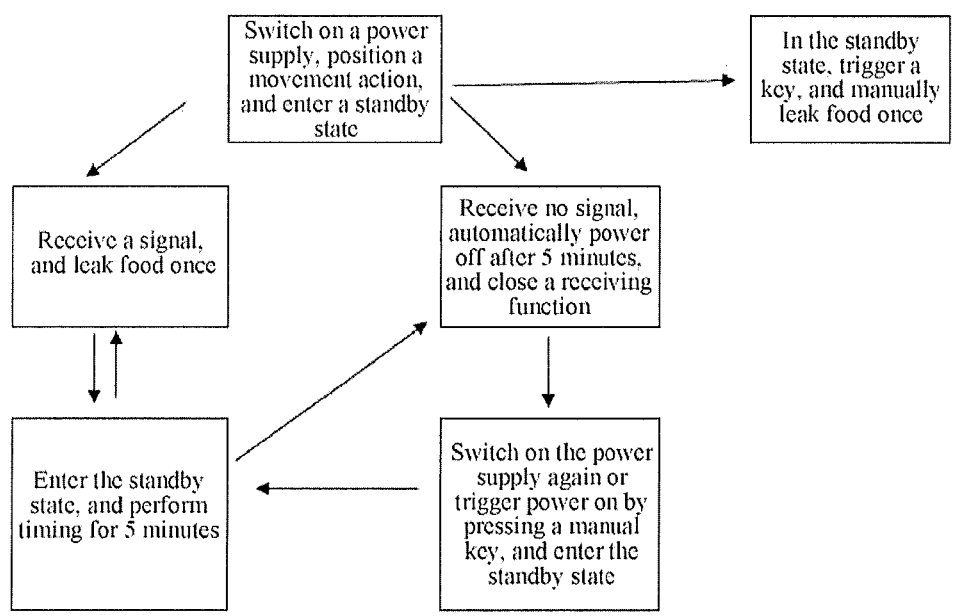
FIG. 6 shows a partial signal receiving procedure of a control signal receiver.

As a preferred operation mode, the present invention further discloses a manner in which the LED indicator lamp and whether the controller is in a to-be-triggered state are combined and united. For procedures of transmitting and receiving a trigger signal, refer to flowcharts in FIG. 5 and FIG. 6.

What is claimed is:

1. An entertaining feeder, wherein the feeder is mainly formed by a feeding body and a controller, wherein the feeding body comprises:
   a food container provided with a food leaking hole, the food container being rotatable along a rotation shaft, and a control signal receiver being disposed at the rotation shaft;
   a bracket, the rotation shaft being fastened to the bracket; and
   a food tray, the food tray being correspondingly disposed below the food leaking hole;
   and the controller comprises:
   a control signal transmitter, the control signal transmitter corresponding to the control signal receiver; and
   a controller positioner, the controller positioner being disposed at the control signal transmitter,
   wherein the controller is removably attachable to the feeding body,
   wherein the controller is programmed to control, in response to an action from a user of the feeder, the providing of the food from the food container to the food tray, so as to enable the user to acquire a conditioned response associating the controller with the providing of the food, and to mobilize sense organs of the user,
   wherein the food container is a hollow sphere provided with the food leaking hole, an opening and closing louvre blade is disposed inside the food leaking hole, and the food container further comprises a food leaking hole regulating switch connected to the opening and closing louvre blade, and a food leaking hole regulating switch moving groove disposed correspondingly,
   wherein the entertaining feeder further includes a removable and insertable sucking disc, the removable and insertable sucking disc fastened to the bottom of the controller, and
   wherein the user is a pet.

2. The entertaining feeder according to claim 1, further comprising a housing, wherein the bracket is disposed inside the housing, the food tray is a drawable food bowl, and a groove for the food bowl to be drawn to move is formed below the bracket.

3. The entertaining feeder according to claim 2, further comprising a food guiding groove, wherein one end of the food guiding groove is disposed below the food leaking hole, and the other end is connected to the food bowl.

4. The entertaining feeder according to claim 2, wherein a buckle and a slot that match each other are formed correspondingly on the housing and the controller.

5. The entertaining feeder according to claim 2, wherein the housing comprises a cover and a housing body, wherein a manual signal transmitter is further disposed on the cover, and the manual signal transmitter corresponds to the control signal receiver.

6. The entertaining feeder according to claim 1, wherein the controller positioner is a bait container with an air vent.

7. The entertaining feeder according to claim 6, wherein the controller includes a single switch that is pressed by the user to provide the food from the food container to the food tray.

8. The entertaining feeder according to claim 1, wherein the controller positioner is an LED lamp.

9. The entertaining feeder according to claim 1, wherein the control signal transmitter is a radio frequency signal transmitter, and the control signal receiver is a radio frequency signal receiver.

* * * * *